(12) United States Patent
Minakata

(10) Patent No.: US 7,483,609 B2
(45) Date of Patent: Jan. 27, 2009

(54) IMAGE WAVELENGTH CONVERSION DEVICE, METHOD OF MANUFACTURING THE DEVICE, AND IMAGE CONVERSION SYSTEM USING THE DEVICE

(75) Inventor: Makoto Minakata, Hamamatsu (JP)

(73) Assignee: Hamamatsu Foundation for Science and Technology Promotion, Shizuoka (JP)

( * ) Notice: Subject to any disclaimer, the term of this patent is extended or adjusted under 35 U.S.C. 154(b) by 0 days.

(21) Appl. No.: 10/594,929

(22) PCT Filed: Mar. 15, 2005

(86) PCT No.: PCT/JP2005/004484

§ 371 (c)(1),
(2), (4) Date: Jun. 19, 2007

(87) PCT Pub. No.: WO2005/098528

PCT Pub. Date: Oct. 20, 2005

(65) Prior Publication Data
US 2007/0284529 A1 Dec. 13, 2007

(30) Foreign Application Priority Data
Mar. 30, 2004 (JP) ............................. 2004-098297

(51) Int. Cl.
| G02B 6/00 | (2006.01) |
| G02B 6/04 | (2006.01) |
| G02B 6/06 | (2006.01) |
| G02F 1/01 | (2006.01) |
| G02F 1/035 | (2006.01) |

(52) U.S. Cl. ............................... 385/122; 385/1; 385/2; 385/3; 385/115; 385/116; 385/121; 359/326; 359/328; 359/332

(58) Field of Classification Search ................... 385/122
See application file for complete search history.

(56) References Cited

U.S. PATENT DOCUMENTS 5,028,107 A * 7/1991 Bierlein et al. ............... 359/328
5,036,220 A * 7/1991 Byer et al. ................... 359/328

(Continued)

FOREIGN PATENT DOCUMENTS

JP 56-043519 A 4/1981

(Continued)

OTHER PUBLICATIONS

Makoto Minakata and Shigehiro Nagano "Design of Highly Efficient SHG Blue Light Source by Using a Propagation-Mode Control Method" Dec. 3, 1999.

(Continued)

Primary Examiner—Frank G Font
Assistant Examiner—Ryan Lepisto
(74) Attorney, Agent, or Firm—Michael A. Satori; Steven J. Schwarz; Venable LLP

(57) ABSTRACT

An image wavelength conversion device for converting an infrared light image into a visible light, a method of manufacturing the device, and an image conversion system using the device are provided. The image wavelength conversion device is formed by an optical waveguide array 3 in which one end and the other end of each of a multitude of quasi-phase-matching sum frequency generating optical waveguides are aligned in a two-dimensional plane. One plane of the optical waveguide array 3 forms an incident plane which includes respective waveguides as elements thereof, and the other plane of the optical waveguide array 3 forms an exit plane which includes waveguides corresponding to the waveguides of the incident plane as elements thereof. From an incident light ($\lambda_1$) and an excitation light ($\lambda_2$) incident to an arbitrary element of the incident plane, an output light ($\lambda_3$) having the relationship of $(\lambda_1)^{-1}+(\lambda_2)^{-1}=(\lambda_3)^{-1}$ is generated in the corresponding waveguide element. $\lambda_1$, $\lambda_2$, and $\lambda_3$ here represent the wavelength of the incident light, the wavelength of the excitation light, and the wavelength of the output light, respectively.

3 Claims, 4 Drawing Sheets

U.S. PATENT DOCUMENTS

| | | | | |
|---|---|---|---|---|
| 5,295,218 | A | * | 3/1994 | Agostinelli et al. .......... 385/122 |
| 5,341,449 | A | * | 8/1994 | Chikuma ..................... 385/122 |
| 5,415,743 | A | * | 5/1995 | Harada ........................ 427/466 |
| 5,434,700 | A | * | 7/1995 | Yoo ............................ 359/332 |
| 5,504,616 | A | * | 4/1996 | Shinozaki et al. ............ 359/326 |
| 5,732,177 | A | * | 3/1998 | Deacon et al. ............... 385/122 |
| 5,796,902 | A | * | 8/1998 | Bhat et al. ................... 385/122 |
| 5,815,307 | A | * | 9/1998 | Arbore et al. ................ 359/328 |
| 5,912,910 | A | * | 6/1999 | Sanders et al. ................ 372/22 |
| 6,445,491 | B2 | * | 9/2002 | Sucha et al. ................. 359/330 |
| 6,806,986 | B2 | * | 10/2004 | Asobe et al. ................. 359/238 |
| 2006/0109542 | A1 | * | 5/2006 | Mizuuchi et al. ............ 359/330 |

FOREIGN PATENT DOCUMENTS

| | | |
|---|---|---|
| JP | 05-341342 A | 12/1993 |
| JP | 08-000610 A | 1/1996 |
| JP | 2000-241841 A | 9/2000 |
| JP | 2002-031827 A | 1/2002 |
| JP | 2002-287192 A | 10/2002 |

OTHER PUBLICATIONS

Shigehiro Nagano, Masahiro Konishi, Tsukasa Shiomi, Yoshikazu Nakada and Makoto Minakata "Study on Small Size Polarization Domain Inversion for High-Efficiency SHG Device" Dec. 17, 2001.
International Search Report dated Apr. 25, 2005, issued in PCT/JP2005/004484.

* cited by examiner

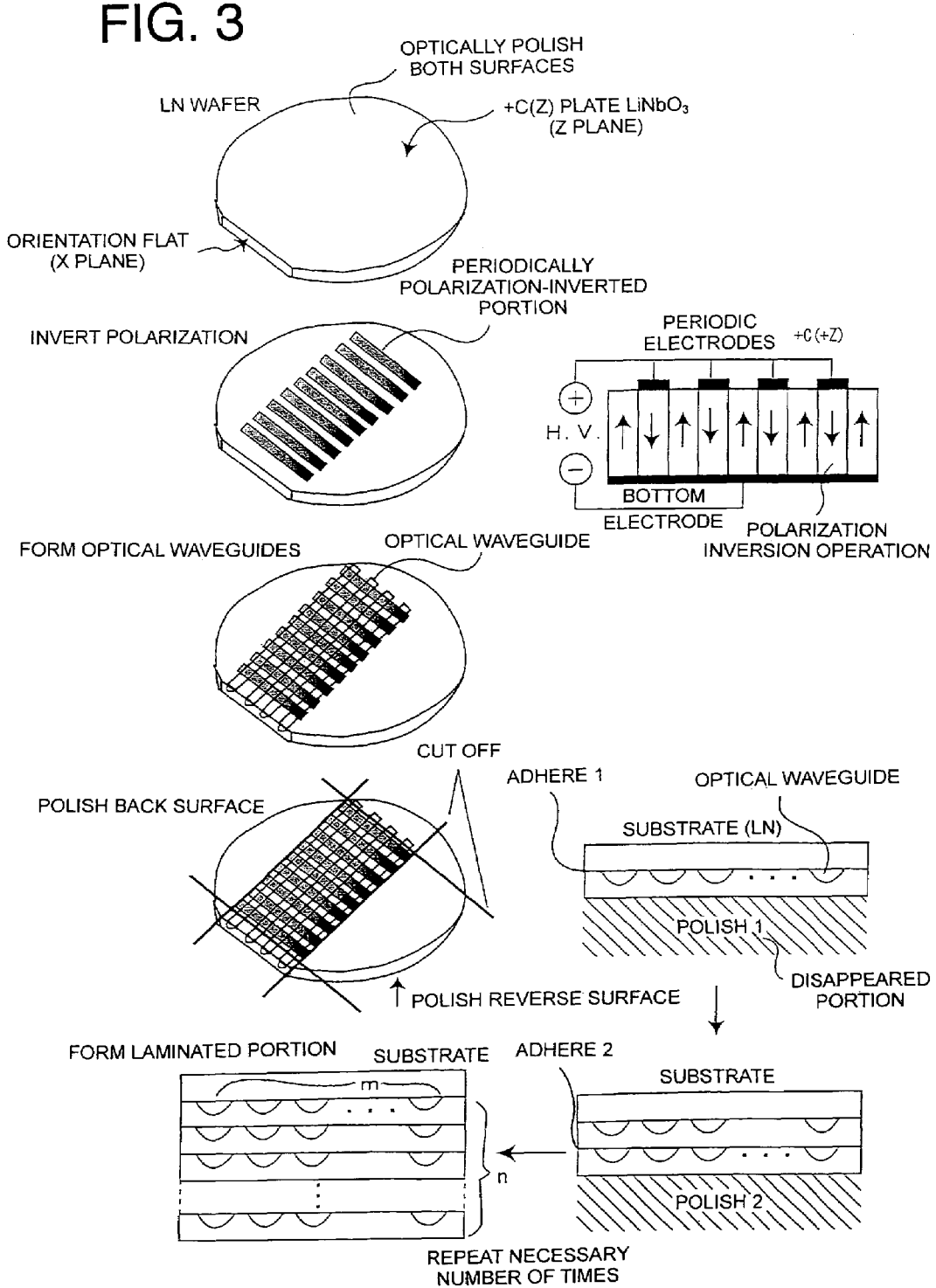

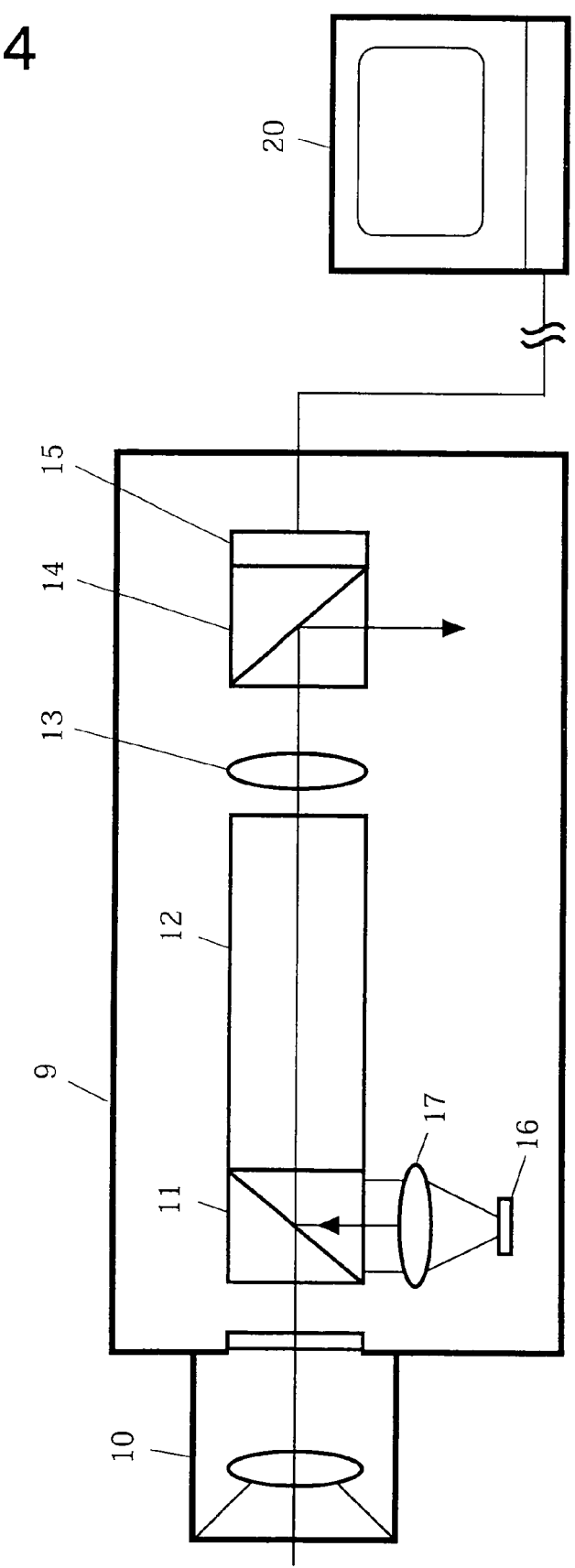

IMAGE WAVELENGTH CONVERSION DEVICE, METHOD OF MANUFACTURING THE DEVICE, AND IMAGE CONVERSION SYSTEM USING THE DEVICE

TECHNICAL FIELD

The present invention relates to an image wavelength conversion device which converts the wavelength of the light forming an image by using the sum frequency optical mixing effect so as to convert an image formed by an electromagnetic wave of a constant wavelength into an image formed by an electromagnetic wave of another wavelength, a method of manufacturing the device, and an image conversion system using the device.

BACKGROUND ART

To achieve a high-efficiency SHG device, the phase needs to be matched between the fundamental wave and the second higher harmonic wave (hereinafter simply referred to as the SH wave), and a variety of studies relating to this have been made. Among others, the QPM-SHG device using the quasi-phase-matching (hereinafter simply referred to as the QPM) is most superior. The QPM is a method of compensating the difference in the propagation coefficient between the fundamental wave and the SH wave through the periodic polarization inversion so as to match the phase.

Further, it has been generally known that, if a light of the first wavelength is mixed with and excited by an excitation light of the second wavelength by using a nonlinear optical crystal having the nonlinear optical effect (the sum frequency optical mixing effect), a light of the third wavelength can be obtained, and that a constant relationship is obtained among them. That is, in the sum frequency optical mixing (photon mixing) having the nonlinear optical effect, if the first light (wavelength $\lambda_1$) and the second light (wavelength $\lambda_2$) are mixed and propagated, the third light (wavelength $\lambda_3$) is obtained, and the relationship $1/\lambda_1 + 1/\lambda_2 = 1/\lambda_3$ is established among them.

Those relating to Patent Document 1, Non-Patent Document 1, and Non-Patent Document 2 relate to the device having the sum frequency optical mixing effect.

The optical device which converts an image formed by an electromagnetic wave of a constant wavelength into an image formed by an electromagnetic wave of another wavelength, particularly when the above first wavelength forms the infrared light, i.e., when the infrared imaging measurement is performed, is an extremely important technique as the "eye" in the field of the global environment and the space environment remote sensing. Currently, infrared cameras using the pyro device array, for example, are used. These publicly known infrared cameras are extremely expensive and thus difficult to be easily applied to other fields than specialized industries such as the space and defense industries, and also have difficulty in responding at a high speed equal to or faster than a nanosecond.

Patent Document 1: Japanese Unexamined Patent Application Publication No. 2002-31827

Non-Patent Document 1: "Design of Highly Efficient SHG Bule Light Source by Using a Propagation-Mode Control Method," Makoto Minakata and Shigehiro Nagano, Shizuoka University Electronics Research Institute Study Report, 1999, Vol. 34

Non-Patent Document 2: "Study on Small Size Polarization Domain Inversion for High-Efficiency SHG Device," Shigehiro Nagano, Makoto Minakata, et al., Shizuoka University Electronics Research Institute Study Report, 2001, Vol. 36

DISCLOSURE OF INVENTION

Problem to be Solved by the Invention

Visualization of an invisible image including an infrared light image or conversion of the image into data (real-time processing) has been strongly requested not only in the above fields but also in other fields. For example, research and development have rapidly progressed recently on the technique or device for easily visualizing an invisible electromagnetic wave image including a millimeter wave, a terahertz wave, or the like, but the achievement of the technique or device lags behind and thus has been strongly longed for.

A principal object of the present invention is to provide an optical device which converts an image formed by an electromagnetic wave of a constant wavelength into an image formed by an electromagnetic wave of another wavelength by using the sum frequency optical mixing effect.

Another object of the present invention is to provide a method of manufacturing the above device.

Still another object of the present invention is to provide an image conversion system using the above device.

Means to Solve the Problem

To achieve the above objects, in an image wavelength conversion device according to an embodiment of the present invention, one end and the other end of each of a multitude of quasi-phase-matching sum frequency generating optical waveguides are aligned in a two-dimensional plane to form an optical waveguide array. Further, one plane of the optical waveguide array forms an incident plane which includes respective waveguides as elements thereof, and the other plane of the optical waveguide array forms an exit plane which includes waveguides corresponding to the waveguides of the incident plane as elements thereof. Furthermore, from an incident light ($\lambda_1$) and an excitation light ($\lambda_2$) incident to an arbitrary element of the incident plane, an output light ($\lambda_3$) is generated in the corresponding waveguide element. The output light ($\lambda_3$) has the relationship of $(\lambda_1)^{-1} + (\lambda_2)^{-1} = (\lambda_3)^{-1}$, wherein $\lambda_1$, $\lambda_2$, and $\lambda_3$ represent the wavelength of the incident light, the wavelength of the excitation light, and the wavelength of the output light, respectively.

According to an image wavelength conversion device according to another embodiment of the present invention, the incident light is an invisible light ranging from the infrared light to the millimeter wave and the excitation light has a wavelength for making the output light a visible light, and the incident light is most preferably an infrared light of 3.5 μm and the excitation light and the output light are 0.8 μm and 0.65 μm, respectively.

According to an image wavelength conversion device according to another embodiment of the present invention, the optical waveguide array having a constant opening corresponding to the incident light is arranged in an m×n matrix state, and the mixing for generating the sum frequency is performed in each of the waveguides.

A method according to another embodiment of the present invention is a method of manufacturing an image wavelength conversion device. The method includes: a step of preparing a nonlinear optical crystal wafer; a step of forming a polarization-inverted portion on the nonlinear optical crystal wafer with a constant period in a constant direction; a step of preparing optical waveguide elements by separating the nonlinear optical crystal wafer into a multitude of optical waveguides having a constant length in a constant direction; a step of joining the optical waveguide elements, with the optical waveguide elements being optically separated from one another; and a step of forming a collective plane including one end plane of each of the elements into an incident plane, and forming a collective plane including the other end plane of each of the elements into an exit plane.

An image wavelength conversion device system according to another embodiment of the present invention includes: an image wavelength conversion device including an incident plane and an exit plane formed by two-dimensionally aligning one end and the other end of each of a multitude of quasi-phase-matching sum frequency generating optical waveguides; an image forming optical system for forming an image (wavelength $\lambda_1$) on the incident plane of the image wavelength conversion device; an excitation light optical system for applying an excitation light (wavelength $\lambda_2$) to the incident plane of the image wavelength conversion device; and image receiving means for receiving an image of a third wavelength (wavelength $\lambda_3$) appeared on the exit plane of the image wavelength conversion device.

EFFECTS OF THE INVENTION

The photon mixing device of the present invention can perform the wavelength conversion to convert infrared light image data into visible light image data at a higher speed than a conventional device. Further, the photon mixing device of the present invention can achieve high resolution and high sensitivity of the infrared light image, and thus can produce a low-cost, practical infrared camera. Furthermore, according to the image wavelength conversion device system of the present invention using the above infrared camera, it is possible to provide an infrared camera of an extremely small size, as compared with a conventional infrared camera.

BRIEF DESCRIPTION OF THE DRAWINGS

FIG. 3 is an explanatory diagram for explaining the manufacturing process of the image wavelength conversion device according to the present invention.

FIG. 4 is a block diagram of an image conversion system using the above device.

Figure 1:
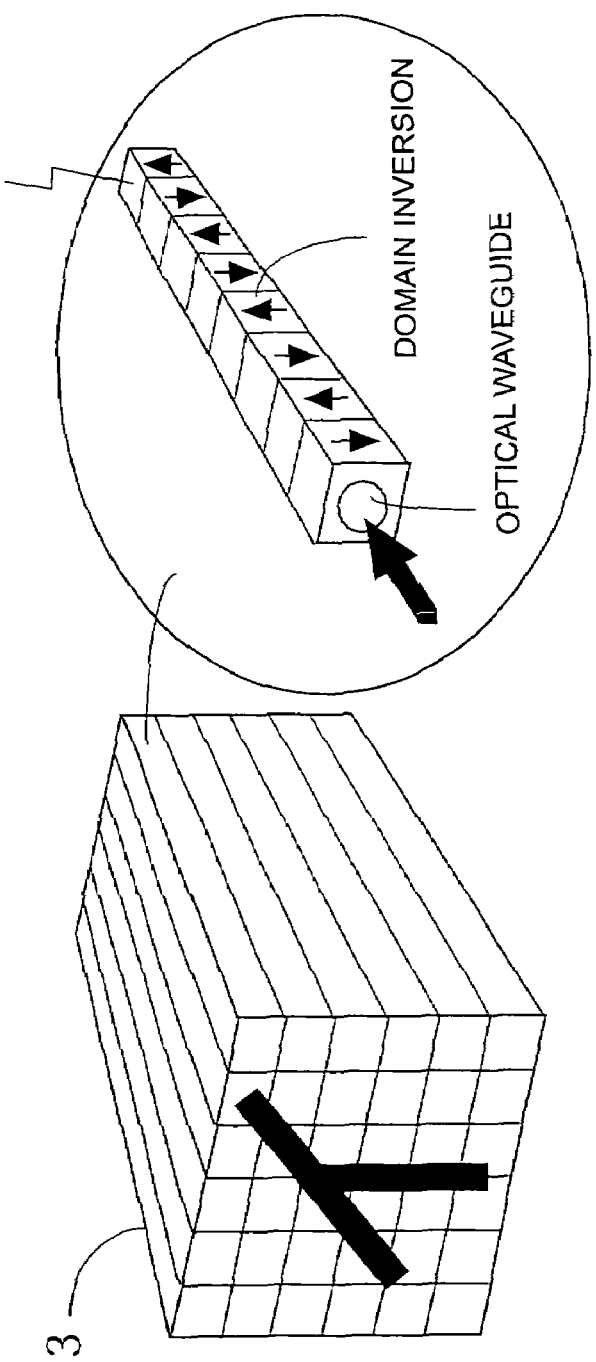
FIG. 1 is a schematic view for explaining the concept of an image wavelength conversion device according to the present invention.

REFERENCE NUMERALS 1 conversion target graphic image
2 half mirror or filter
3 image wavelength conversion device (optical waveguide array)
4 half mirror or filter
5 screen
6 excitation light
7 removed excitation light
9 camera part
10 objective lens
11 beam splitter
12 image wavelength conversion device
14 beam splitter
15 CCD
16 excitation light source (laser diode)
17 collimator lens
20 display device

BEST MODE FOR CARRYING OUT THE INVENTION

Figure 2:
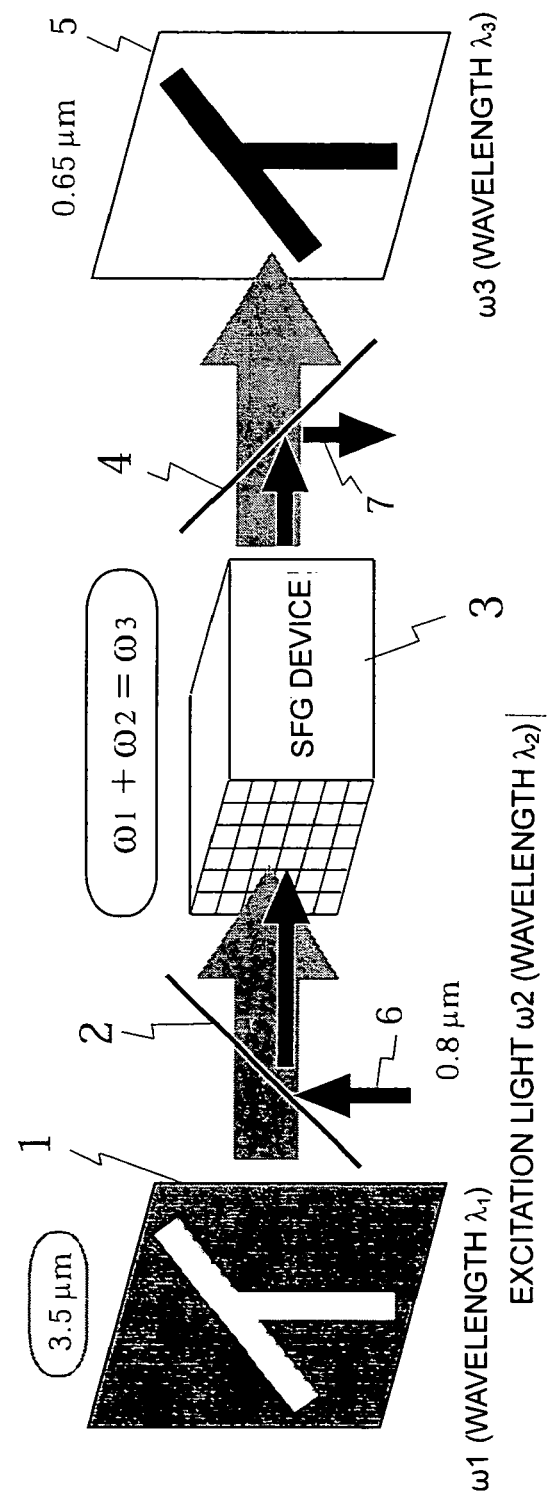
FIG. 2 is a schematic view for explaining the operation of the above image wavelength conversion device.

With reference to the drawings and the like, description will be made below of embodiments of an image wavelength conversion device according to the present invention. FIG. 1 is a schematic view for explaining the concept of the image wavelength conversion device according to the present invention. FIG. 2 is a schematic view for explaining the operation of the above image wavelength conversion device.

In the image wavelength conversion device according to the present invention, a domain-inverted nonlinear optical crystal capable of performing the sum frequency optical mixing (photon mixing) with the nonlinear optical effect is used for an optical waveguide. FIG. 1 shows an image wavelength conversion device 3 formed by a multitude (m×n) of optical waveguides. An optical waveguide 3a is extracted and shown in FIG. 1.

As illustrated in FIG. 2, an image ($\lambda_1$=3.5 μm) of a graphic image 1 is formed on the incident plane of the image wavelength conversion device 3 through a half mirror or filter 2. The half mirror or filter 2 transmits the light of $\lambda_1$ and reflects the light of $\lambda_2$. Meanwhile, it is assumed that an excitation light ($\lambda_2$=0.8 μm) has entered to the entire surface of the incident plane of the image wavelength conversion device 3. From the exit end of the optical waveguide, in which the light emitted from the graphic image 1 and the excitation light have entered, a light having the above-described sum frequency and a wavelength corresponding to $\omega_3$($\lambda_3$=0.65 μm) appears. $\omega_3=\omega_1+\omega_2$ is equivalent to $(\lambda_1)^{-1}+(\lambda_2)^{-1}=(\lambda_3)^{-1}$. Among the lights emitted from the image wavelength conversion device 3, the light having the wavelength $\lambda_3$ is transmitted through a half mirror or filter 4 and is projected on a screen 5. The light of the wavelength $\lambda_3$ is a visible light and thus can be observed with eyes. For the sake of simplification, projection means is omitted in FIG. 2. The excitation light not contributed to the sum frequency mixing is removed as needed by the half mirror or filter 4. That is, according to the above-described image wavelength conversion device, through the photon mixing of the infrared image of 3.5 μm and the excitation light of 0.8 μm, the conversion into the visible image (graphic image) of 0.65 μm can be performed.

With reference to FIG. 3, the manufacturing process of the image wavelength conversion device will be then described, taking an example in which a LiNbO$_3$ crystal (hereinafter referred to as the LN crystal) is used.

(Step of Preparing an LN Wafer)

An LN crystal wafer for forming a substrate is a thin plate cut out (cut into a round slice) from an ingot of 4 to 5 inches in diameter and approximately 30 cm in length, which has been produced by the Czochralski method (a pulling method using a seed crystal), to be parallel to a plane perpendicular to the Z-axis (the direction of pulling the crystal). Both surfaces of the above thin plate are subjected to the optical polishing.

(Step of Inverting Polarization)

After the ingot of the base crystal has been pulled and grown, an electric field is externally applied to the ingot to perform a single domain operation (the operation for aligning the polarization direction Ps to a single direction). The thickness of the wafer forming the substrate is approximately 500 to 200 microns. A photoresist pattern, which includes lines and spaces each having a width of a few microns (a period of approximately 12 microns), is formed on the substantially entire surface of the above optical crystal wafer by the ultraviolet laser drawing method. (In a photoresist of a polymer film, only a part of the photoresist applied with a laser light reacts to the light and disappears through the development using a chemical solution.)

After the periodic resist pattern has been drawn, a gold or aluminum electrode is vapor-deposited on the entire surface. The electrode is also vapor-deposited on the reverse surface. A high voltage pulse (20 KV/mm and 2 to 5 m/sec) is applied between the electrodes on the front and reverse surfaces to perform overall polarization inversion. A part of the surface of the crystal not formed with the resist is applied with the high voltage, and the polarization is inverted. However, the electrode portion on the resist is not applied with the sufficiently high voltage required for the inversion. Thus, the polarization inversion does not occur. The present drawing illustrates a so-called lift-off method, in which the resist portion is omitted.

The wafer coated with the resist is placed on a stage, in which the simultaneous movement in the x and y directions in a plane perpendicular to the laser light beam is precisely controlled by a computer. The laser light is applied directly from the above to the wafer coated with the resist, and at the same time, the wafer is moved by a desired distance. Thereby, a pattern of an arbitrary size can be drawn. In the present experiment, a laser light of equal to or lower than 1 mW having a wavelength of 473 nm was applied to a positive type photoresist coated on the wafer. The periodic resist pattern can be formed by scanning the beam in a zigzag manner.

(Step of Forming the Optical Waveguides)

The optical waveguides each having a thickness of a few microns to ten-odd microns are formed over the entire surface of the wafer by the photolithography method to be perpendicular to the periodic polarization inversion. In the formation, a part of the resist excluding the optical waveguides is first irradiated according to the laser exposure method, developed, and removed to be patterned. Thereafter, tantalum is vapor-deposited on the wafer, and the optical waveguide portions are exposed by the lift-off method. In this case, the number of the optical waveguides is approximately 1400. Then, the wafer is immersed in a phosphoric acid solution heated up to approximately 240 degrees for a desired time period (approximately twenty minutes to one hour, although the time period differs depending on the size of the wafer). Thereafter, the tantalum is removed, and the heat treatment is performed at 400 degrees for approximately one hour to form the optical waveguides. Through this operation, Li in the crystal is exchanged with a proton in the phosphoric acid, and the optical waveguides having a high refractive index can be easily formed in the LN wafer.

(Polishing the Back Surface and Cutting-off)

Thereafter, a portion of POLISH 1 in an enlarged cross-sectional view on the right side in the drawing is polished and removed. The substrate on the upper side and the upper surfaces of the optical waveguides are adhered together, and unnecessary portions are removed after completion of the polishing. A multitude of sheet-like chips each having an approximate size of 35 mm×20 mm are cut off to form one-dimensional arrays. Eventually, the LN wafer is cut into sheet-like chips each having an approximate size of 35 mm×20 mm×50 μm (thickness). Approximately eight sheet-like chips are obtained from one wafer.

(Formation of a Laminated Portion)

The device is formed by "laminating the thin one-dimensional arrays." Each of intervals between the optical waveguides of the one-dimensional arrays is approximately 20 microns, and is uniform and homogeneous. The interference between the optical waveguides can be ignored. Alternatively, each of intervals between the laminated layers of the imaging arrays is approximately 50 microns, and an ultraviolet curing resin is used as the material for use in the lamination. A multitude of these chips are laminated to form an SFG device 3 of FIG. 2. In the chip having the width of 35 mm, 640 of the optical waveguides each having a width of 30 microns are aligned at an interval of 20 microns (the width of 35 mm was selected in consideration of 50 μm×640=32 mm).

With reference to FIG. 4, description will be then made of an image conversion system using the above image wavelength conversion device. This system is an infrared imaging system formed by using the image wavelength conversion device as described above. In an image wavelength conversion device 12, 640×480 of the optical waveguides each having an optical waveguide opening of 30 μm are integrated.

FIG. 4 is a block diagram of the image conversion system using the above device. An image including an infrared light ($\lambda_1$=3.5 μm) is focused and formed on the incident plane of the image wavelength conversion device 12 through an objective lens 13 and a beam splitter 11. Meanwhile, an excitation light ($\lambda_2$=0.8 μm) emitted from a laser diode 16, which is an excitation light source, illuminates the incident plane of the image wavelength conversion device 12 through a collimator lens 17 and the beam splitter 11. As a result, an image of a visible light ($\lambda_3$=0.65 μm) appeared on the exit plane of the image wavelength conversion device 12 is focused and formed on a CCD 15, which is made of silicon and is an imaging device, through the lens 10 and a beam splitter 14. The excitation light ($\lambda_2$=0.8 μm) not contributed to the sum frequency mixing is reflected and removed by the beam splitter 14. The output from the CCD 15, which is the imaging device, is displayed on a display 20.

The image wavelength conversion device 12 forming the main part of the present system is extremely small, e.g., (32 mm×25 mm×20 mm). Therefore, a camera part 9 can be formed into a size approximately equal to or smaller than the size of currently commercially available digital video cameras.

Modified Example

The detailed description has been made of the visualization of the infrared light of $\lambda_2$=3.5 μm. Similarly, an infrared image of 1 to 5 μm can be visualized, and wide application to the conversion of another wavelength is possible. Although the example of using the LiNbO$_3$ crystal has been illustrated, a LiTaO$_3$ crystal can be similarly used.

INDUSTRIAL APPLICABILITY

The photon mixing device according to the present invention can perform the wavelength conversion to convert infrared light image data into visible light image data at a higher speed than a conventional device, and thus can be widely applied in the field of image transmission. Further, the photon mixing device according to the present invention can achieve high resolution and high sensitivity of the infrared light image, and thus can produce a low-cost, practical infrared camera, which can be widely used in a dark-field monitoring device or in such a field as monitoring of a phenomenon in an adverse environment. Furthermore, according to the image wavelength conversion device system of the present invention using the above infrared camera, it is possible to provide an infrared camera of an extremely small size, as compared with a conventional infrared camera. Accordingly, the image wavelength conversion device system can be used in a field which requires monitoring by a plurality of cameras from multiple directions.

The invention claimed is:

1. An image wavelength conversion device, wherein one end and the other end of each of a multitude of quasi-phase-matching sum frequency generating optical waveguides are aligned in a two-dimensional plane to form an optical waveguide array, wherein one plane of the optical waveguide array forms an incident plane which includes respective waveguides as elements thereof, and the other plane of the optical waveguide array forms an exit plane which includes waveguides corresponding to the waveguides of the incident plane as elements thereof, and wherein, from an incident light ($\lambda_1$) and an excitation light ($\lambda_2$) incident to an arbitrary element of the incident plane, an output light ($\lambda_3$) is generated in the corresponding waveguide element, the output light ($\lambda_3$) having the relationship of $(\lambda_1)^{-1}+(\lambda_2)^{-1}=(\lambda_3)^{-1}$ in which $\lambda_1, \lambda_2$, and $\lambda_3$ represent the wavelength of the incident light, the wavelength of the excitation light, and the wavelength of the output light, respectively, wherein the incident light is an invisible light ranging from the infrared light to the millimeter wave and the excitation light has a wavelength for making the output light a visible light, and wherein the incident light is most preferably an infrared light of 3.5 μm and the excitation light and the output light are 0.8 μm and 0.65 μm, respectively.

2. The image wavelength conversion device according to claim 1, wherein the optical waveguide array having a constant opening corresponding to the incident light is arranged in an m×n matrix state, and mixing for generating the sum frequency is performed in each of the waveguides.

3. An image wavelength conversion device system comprising:

an image wavelength conversion device including an incident plane and an exit plane formed by two-dimensionally aligning one end and the other end of each of a multitude of quasi-phase-matching sum frequency generating optical waveguides;

an image forming optical system for forming an image (wavelength $\lambda_1$) on the incident plane of the image wavelength conversion device;

an excitation light optical system for applying an excitation light (wavelength $\lambda_2$) to the incident plane of the image wavelength conversion device; and image receiving means for receiving an image of a third wavelength (wavelength $\lambda_3$) appeared on the exit plane of the image wavelength conversion device, wherein the incident light is an invisible light ranging from the infrared light to the millimeter wave and the excitation light has a wavelength for making the output light a visible light, and wherein the incident light is most preferably an infrared light of 3.5 μm and the excitation light and the output light are 0.8 μm and 0.65 μm. respectively.

* * * * *